Figures 4, 5:
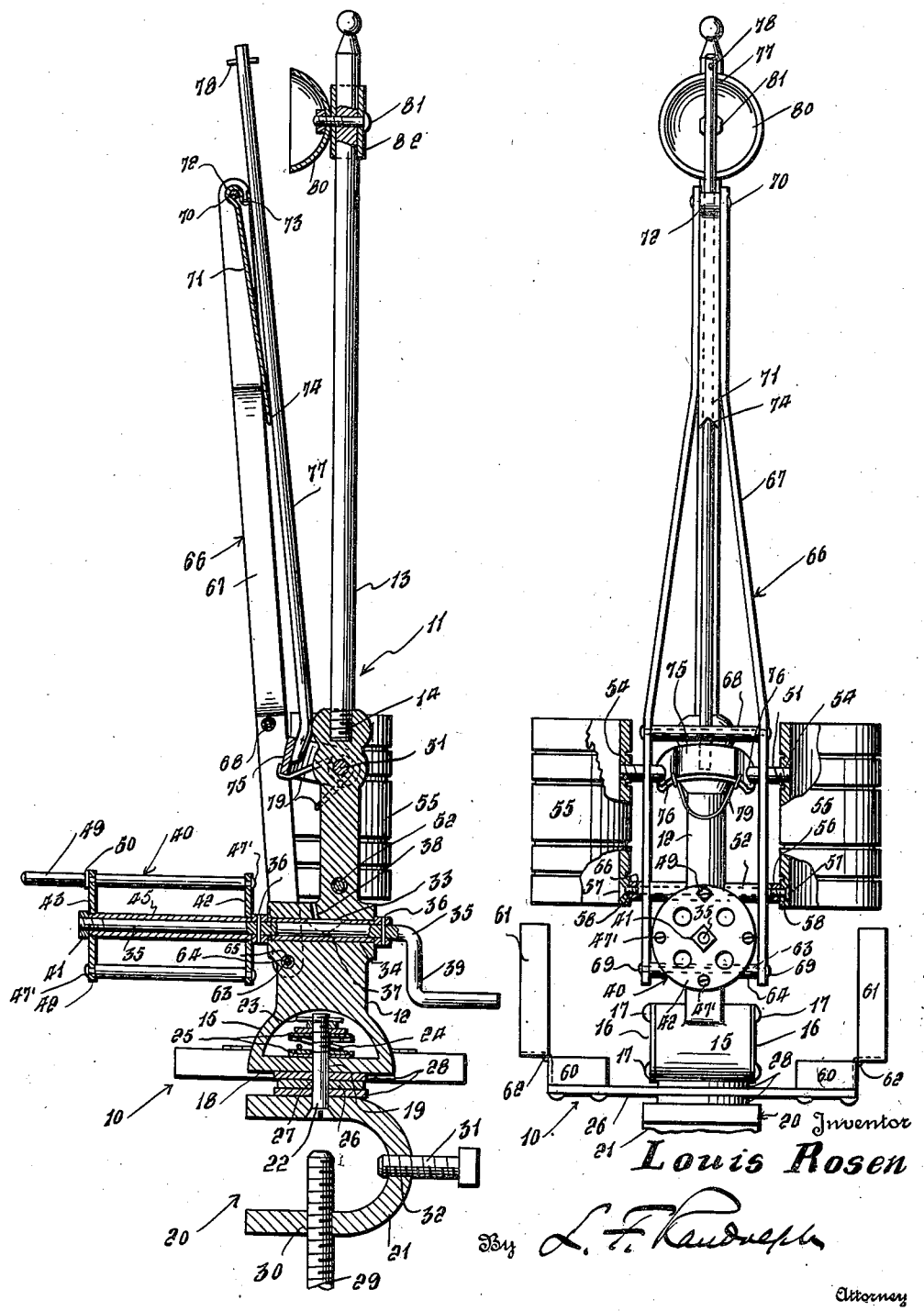

May 12, 1942.   L. ROSEN   2,283,092
FISHING OUTFIT
Filed March 13, 1941   3 Sheets-Sheet 1
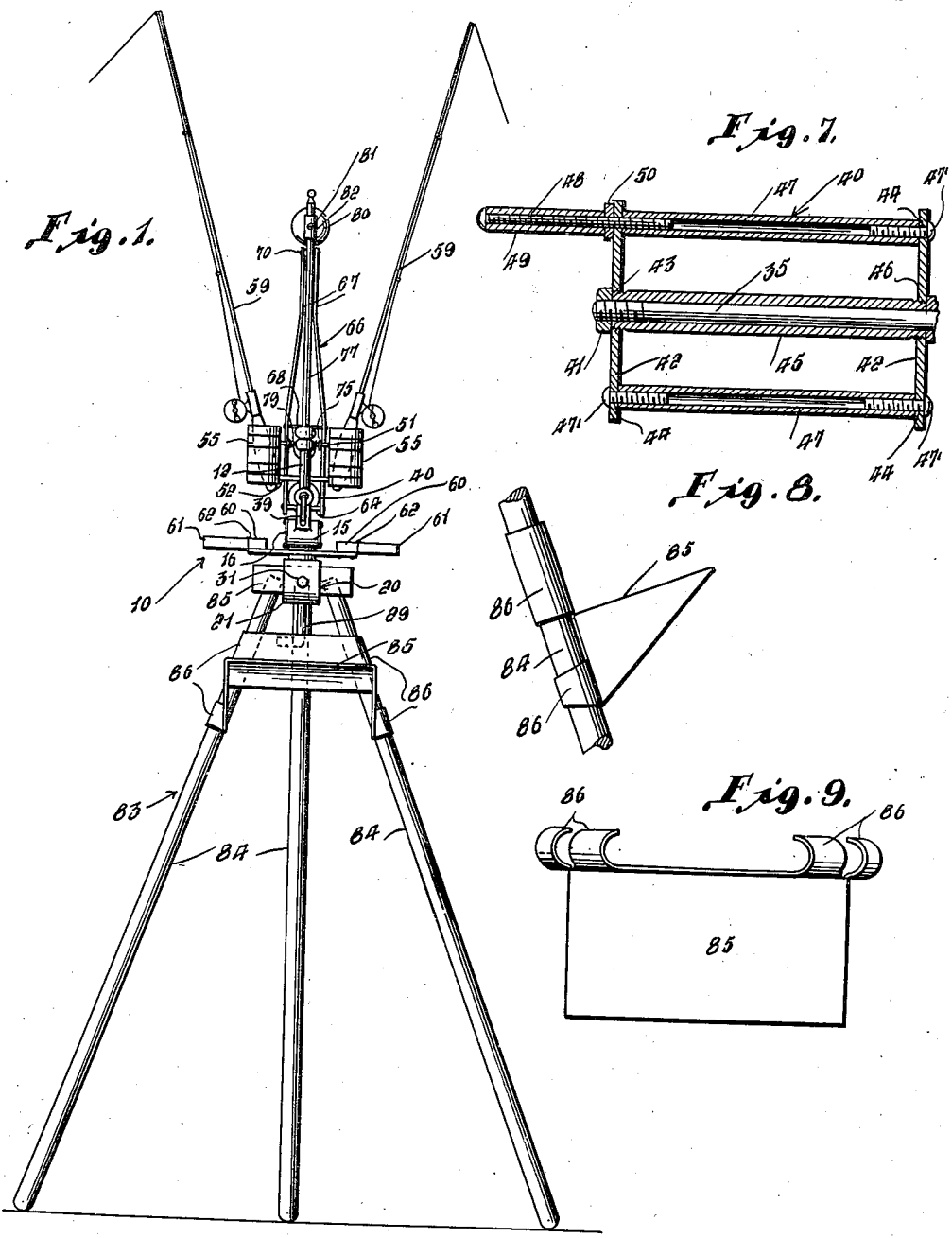
Inventor
Louis Rosen
By L. F. Laudreth
Attorney

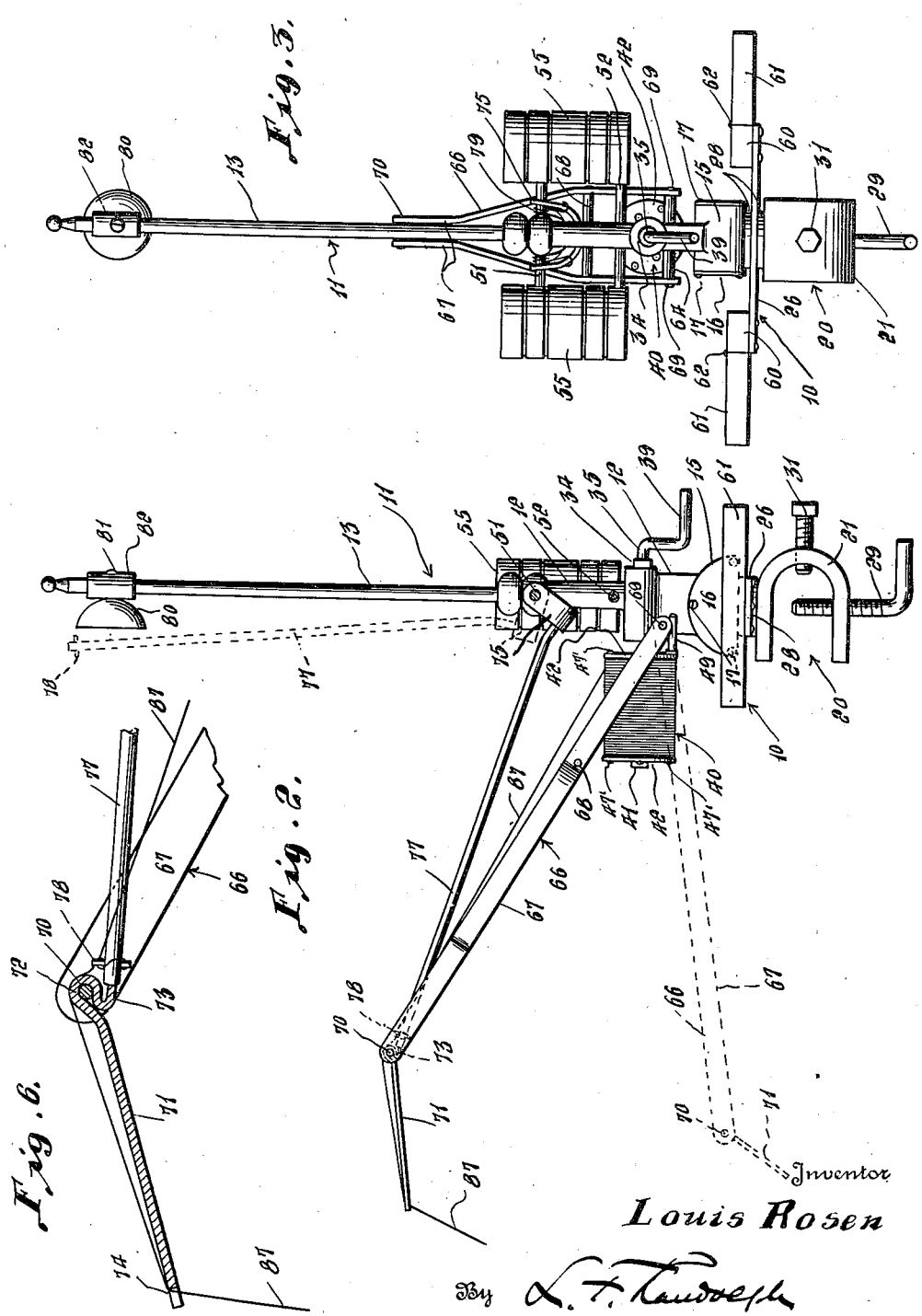

May 12, 1942.  L. ROSEN  2,283,092
FISHING OUTFIT
Filed March 13, 1941  3 Sheets-Sheet 3

Inventor
Louis Rosen
By L. F. Randolph
Attorney

Patented May 12, 1942

2,283,092

UNITED STATES PATENT OFFICE 2,283,092

FISHING OUTFIT

Louis Rosen, Jacksonville, Fla.

Application March 13, 1941, Serial No. 383,213

7 Claims. (Cl. 43—15)

This invention relates to an improved construction of fishing outfit or rig which is adapted for use by fishermen while fishing from wharves, row boats or larger power boats, and which may also be used for fishing from the shore.

More particularly, it is an aim of the invention to provide a device by means of which a rod and reel can be supported in substantially an upright position, either while in use or while not in use to avoid the necessity of having to lay the rod and reel down on a wharf or in the sand.

Still a further aim of the invention is to provide a device by means of which one person may fish with a plurality of line simultaneously.

Still another object of the invention is to provide a device having a reel or a spool mounted thereon and on which a line to be dried may be wound.

Still a further aim of the invention is to provide a fishing outfit or rig including a shelf for holding fishing tackle and one or a plurality of hingedly mounted shelves adapted to be used for cutting and holding bait.

Still a further and a particular aim of the invention is to provide a device having means for holding a fishing line and which is actuated automatically by a pull on the line in response to a strike or bite, for actuating a trigger or latch member to release a spring actuated member, to which the line is connected and which is urged by its spring in a direction for applying a pull or jerk on the line.

Other objects and advantages of the invention will hereinafter become more fully apparent from the following description of the drawings, which illustrate a preferred embodiment thereof, and wherein—

Figure 1 is a side elevational view showing the fishing outfit assembled and supported on a tripod and showing two fishing rods supported thereby, Figure 2 is a side elevational view of a portion of the fishing outfit and showing the automatic fishing means in full lines in a set position and in dotted lines in a released position, Figure 3 is a side elevational view taken at right angles to Figure 2, Figure 4 is a side elevational view, partly in vertical section, of a portion of the fishing outfit shown in Figures 2 and 3, Figure 5 is a side elevational view, partly in section of the same, Figure 6 is an enlarged fragmentary side elevational view of a portion of the device, Figure 7 is a longitudinal vertical sectional view of the spool, forming a portion of the device, Figure 8 is a fragmentary side elevational view of a portion of the device and showing the tackle holding shelf, and Figure 9 is a top plan view of the tackle holding shelf.

Referring more particularly to the drawings, wherein like reference characters designate like or corresponding parts throughout the different views, 10 designates generally the fishing outfit or rig in its entirety and which includes a mast or standard 11 which includes an enlarged lower section 12 and an elongated upper section 13. The sections 12 and 13 are threadably and detachably connected in end to end relationship to one another, as seen at 14, in Figure 4. Referring to Fig. 4, the lower section 12 is provided at its lower end with an enlarged hollow portion 15 having removable side plates 16, as seen in Figure 5, which are attached thereto by fastenings 17. The portion 15 is provided with a substantially flat bottom 18 having a central opening 19.

A clamp, designated generally 20, includes a U-shaped member 21 through one leg of which projects a bolt 22, the head of which is countersunk in said leg, on the inner side thereof and the shank of which projects outwardly therefrom and through the opening 19. The threaded free end of the bolt 22, which is disposed in the hollow portion 15, is provided with a lock nut 23, an expansion coil spring 24, and washers 25, said washers being disposed between the spring 24 and the bottom 18 and between the spring and the lock nut 23. A bar 26 is disposed between the bottom 18 and the aforementioned end of the U-shaped member 21 and is provided with an opening 27 intermediate of its ends, for loosely engaging the bolt 22. A washer 28 is disposed above and beneath the bar 26. It will thus be seen that when the nut 23 is tightened, the bar 26 and the mast or standard 11 will be frictionally held in adjusted positions relatively to the clamp 20 but may each be turned relatively to the other and to the clamp 20. The clamp 20 also includes a clamping screw 29, the threaded shank end of which extends inwardly through a threaded opening 30 in the other leg of the U-member 21 and which is adapted to cooperate with said first mentioned leg of the U-member 21 for clamping a wharf railing, a row boat seat or the like therebetween, for supporting the mast 11 in substantially an upright position thereon. The clamp 20 is also provided with a set screw 31 which engages a threaded opening 32 in the intermediate portion of the U-member 21 and which extends inwardly thereof and which is adjustable for engaging against the edge of the support to which the clamp 20 is secured for preventing the clamp from turning relatively thereto.

The lower section 12, above and adjacent its portion 15, is provided with a transverse opening forming a bearing 33. A bushing 34 is mounted on the intermediate portion of a shaft 35 and keyed thereto by means of a pin 36. The bushing 34 is journaled in the bearing 33 and is provided with a cut-out portion 37 which is adapted to register, when in certain positions, with a lubricating port 38 for conveying a lubricant to the bearing 33. The shaft 35 is provided with a crank 39 at one end and a spool 40 is detachably mounted on the opposite end of the shaft 35, which last mentioned end is threaded at its extremity to receive a nut 41 for detachably mounting the spool 40 thereon.

As best seen in Figures 4 and 7, the spool 40 includes a pair of corresponding disks 42, each of which is provided with a central threaded opening 43 and a plurality of threaded circumferentially spaced openings 44, adjacent its periphery. A tube 45 is provided with externally threaded ends 46 for engaging the threaded openings 43 for connecting the disks 42 in spaced apart relationship. The shaft 35 extends through the tube 45 and the nut 41 is adapted to be tightened to clamp the tube 45 between the nut and one end of the bushing 33 to thereby key the spool 40 to the shaft 35. A plurality of tubes 47 are mounted between the disks 42 and are disposed in alinement with the alined openings 44 of the disks. Screws 47' engage the threads of the openings 44 and project inwardly of the disks 42 for engaging the ends of the tubes 47 for detachably mounting said tubes between the disks 42. An elongated screw 48 may be used in lieu of one of the screws 47' and mounted so that its headed end projects outwardly from one of the disks 42 and so that the headed end will be disposed in spaced relationship to said disk. A sleeve 49 is turnably mounted on the screw 48 between the aforementioned disk 42 and the head of said screw to combine with said screw and disk to form a crank for revolving the spool 40, when said crank is disposed, as illustrated in Figure 4, on the outer end of the spool. A lock nut 50 is mounted on the screw 48 between the aforementioned disk 42 and an end of the sleeve 49. If desired, the sleeve 49 and the screw 48 can be mounted at the opposite, inner end of the spool 40, as illustrated in Figure 2, to form a stop for engaging the section 12 to prevent rotation of the spool.

Above the bearing 33, the section 12 is provided with transverse tubes 51 and 52 which are fixedly disposed therein intermediate of their ends. The tube 51 is provided with threaded ends 53 which are externally threaded for engaging corresponding threaded openings 54 in corresponding tubular members 55. The tube 52 is provided with internally threaded ends 56 and screws 57 extend outwardly through openings 58 in the tubular members 55 to engage the threaded portions 56 to combine with the tube 51 for supporting the tubular members 55 and for holding them in spaced apart relationship to the section 12, as best seen in Figure 5. The tubular members 55, as illustrated in Figure 1, form socket members for receiving the handle or butt ends of fishing rods 59 for supporting the rods 59 on the standard or mast 11.

As best seen in Figures 1 and 3, a block 60 is secured to each end of the bar 26. A shelf 61 is connected by hinges 62 to the outer edge of each block 60 and the hinges 62 are so arranged that the shelves 61 cannot be swung downwardly past substantially horizontal positions, as seen in Figures 1 and 3, and which constitutes the positions of the shelves 61 when they are in use for their normal purpose of forming supports on which bait can be cut and held. The shelves 61 are adapted to be swung upwardly on their hinges 62 to raised inoperative positions, as seen in Figure 5.

Beneath and adjacent the bearing 33, a shaft or pin 63 and a sleeve 64, which is mounted thereon, as best seen in Figure 4, extend through and are journaled in an opening 65 in the member 12 and which is disposed substantially at a right angle to the bore 33. The pin 63 projects beyond the ends of the sleeve 64. A boom 66 includes spaced bars 67 having spacing means 68, adjacent one end of the boom, for holding corresponding ends of the bars 67 in spaced apart relationship to one another. The extremities of said ends of the bars 67 engage the ends of the pin 63, as seen in Figure 5, and abut against the ends of the sleeve 64 and are held thereby in spaced relationship to one another. The extremities of the pin 63 are provided with heads 69 by means of which said aforementioned ends of the bars 67 are connected to the mast 11 for swingably mounting the boom 66. As seen in Figure 5, the bars 67 are provided with converging portions, intermediate of their ends, and the opposite ends of the bars 67 are disposed in adjacent substantially parallel relationship and are connected to one another, at the free end of the boom 66 by means of a pin 70. A bar 71, as best seen in Figure 6, is looped adjacent one end to loosely engage the pin 70, between the bars 67, to pivotally mount the bar 71 on the free end of the boom 66. The extremity of the end of the bar 71, which is adjacent its loop 72 is bent back upon itself to form a detent 73, for a purpose which will hereinafter become apparent, and the opposite, free end of the bar 71 is provided with an outwardly opening notch 74. The bar 71 forms a trigger or latch member, as will hereinafter become more fully apparent.

A U-shaped member 75 is provided with openings 76 in its ends for engaging the tube 51. Openings 76 loosely engage the tube 51 and the U-shaped member 75 is arranged to straddle the section 12 and projects outwardly therefrom toward the boom 66. An arm 77 is secured at one end to the intermediate portion of the U-shaped member 75 and projects upwardly or outwardly therefrom and is provided adjacent its free end with a pin 78 which projects transversely therethrough and which is provided with exposed ends, for a purpose which will hereinafter become apparent. A spring 79, as best seen in Figure 4, is coiled loosely about the tube 51 and is anchored at one end against the section 12 and has its opposite end engaging the under edge of the intermediate portion of the U-shaped member 75 for urging said member upwardly to urge the arm 77 upwardly and inwardly relatively to the mast 11. A gong 80 is connected to the mast 11, adjacent its upper end, by means of a nut and bolt fastening 81 and is spaced from the mast by a sleeve 82.

As illustrated in Figure 1, the mast 11 and the parts connected thereto and carried thereby may be supported by means of a tripod 83 having upwardly converging legs 84 which are detachably connected to the head 85 of the tripod 83. The clamp 20 may be detachably secured to the head 85 for mounting the mast 11 on the tripod 83 as where it is desired to use the fishing outfit or rig 10 for fishing from a beach and it will be obvious that the tripod 83 will support the fishing rods 59 in elevated positions when not in use to prevent sand and other foreign matter from coming in contact with the reels, mounted on the fishing rods. Also, the fishing rig 10, when set up as seen in Figure 1, can be used for holding the fishing rods 59 so that a single fisherman may in this manner fish with a number of lines. A shelf 85 is provided with upwardly and inwardly inclined hook shaped extensions 86 for engaging two of the legs 84 for detachably mounting the shelf 85 on the tripod 83. The shelf 85 provides a support for fishing tackle, not shown, to keep the fishing tackle out of contact with the sand of the beach on which the tripod 83 is mounted.

Assuming that it is desired to use the boom 66 and the arm 77 for automatically fishing a line, a fishing line 87, as seen in Figure 2, is looped several times around the pin 78 after which the boom 66 is swung downwardly and outwardly. The arm 77 is then swung downwardly and outwardly until its free end is beneath and within the free end of the boom 66. The boom and arm are then moved upwardly together until the free end of the arm 77 engages the loop 72. The trigger 71 can then be turned and adjusted to the position, as seen in Figures 2 and 6 and will thus be held by the arm 77. The arm 77 will support the boom 66 and will in turn be held in a lowered position by the boom. The detent 73 will, when the parts are thus positioned, be bearing against the free end of the arm 77. The fishing line 87 is then passed outwardly over the trigger 71 and downwardly through its notch 74 and on into the water. When a fish strikes the line 87 the pull thereon will tend to pull the trigger 71 downwardly and also to pull downwardly on the boom 66 to cause the detent 73 to force the free end of the arm 77 out of engagement with the loop 72. The arm 77 will promptly be swung upwardly by its spring 79 to jerk the line 87. The arm 77 preferably has a certain amount of resiliency or whip so that it can bend slightly to be more readily disengaged from the loop 72 and so that its free end will be whipped against the gong 80 to produce an audible alarm to indicate that a fish is caught on the line 87. The line 87 may be wound on the reel of one of the fishing rods 59 or could be wound on the spool 40.

The line or lines of either or both of the fishing reels of the rods 59 can be wound on the spool 40 for drying and all of the parts of the spool are formed of metal which is resistant to rust and which will not be affected by water and especially salt water. Also, if desired, the spool 40 can be removed and a conventional wooden spool may be mounted on the shaft 35 and clamped by the nut 41 and employed for holding a line for drying. It will be obvious that the spool 40 can be turned either by the crank 39 or the crank handle 49.

In view of the detailed description of the different parts and their functions, a further description of the construction and operation of the device 10 is considered unnecessary.

Various modifications and changes are contemplated and may obviously be resorted to as only a preferred embodiment of the invention has been disclosed.

I claim as my invention:

1. A device of the character described comprising a standard, a boom pivotally connected to the standard and arranged to swing perpendicularly toward and away from said standard, an arm pivotally connected to the standard and mounted to swing perpendicularly toward and away from the standard, a trigger member pivotally connected to the boom, adjacent its free end and provided with a detent for engaging the free end of the arm when the boom and arm are extending relatively to the standard, said arm being adapted to be attached to a fishing line, said fishing line being extended and trained over the free end of the trigger member, and said trigger member being normally held in an extended position, relatively to the boom, by the arm and being adapted to be actuated by a pull on the line for swinging the trigger member relatively to the boom to release the arm.

2. A device as in claim 1, comprising a gong attached to the standard, adjacent its upper end, and arranged to be struck by said arm when the arm is urged upwardly by its spring.

3. A device as in claim 1, comprising a clamp attached to the lower end of the standard for connecting it to a supporting surface and for supporting it in an upright position relatively thereto, said clamp being provided with spring fastening means for attaching it to the standard for frictionally connecting the standard and clamp so that said standard may be turned relatively to the clamp.

4. A fishing outfit comprising a clamp, a mast connected to and projecting upwardly from said clamp, fastening means for yieldably holding the mast in frictional engagement with the clamp and constructed and arranged so that the mast can be revolved relatively to the clamp, and a socket member mounted on said mast for detachably engaging and supporting a fishing rod.

5. A device of the character described comprising a boom mounted to swing perpendicularly, an arm disposed above the boom and mounted to swing perpendicularly, a latch member pivotally connected to the free end of said boom, the free end of said arm being arranged, when the boom and arm are in certain relative positions, for engaging the pivoted end of the latch member, spring means for normally urging the arm upwardly, said arm being adapted to be attached, adjacent its free end, to a fishing line, the fishing line being trained over the free end of the trigger member, said trigger member being held in an extended position relatively to the boom by said arm, and a detent, forming a part of the trigger member and arranged to engage the free end of the arm for releasing said free end from the trigger member when the trigger member is actuated by a pull on the line.

6. A fishing device comprising a support, an arm pivotally connected at one end thereof to the support, spring means for urging the free end of the arm to swing toward the support, the free end of said arm being adapted to be connected to a fishing line, and latch means for holding the arm in an extended position away from the support, said latch means including a lever, swingably connected at one end thereof to the support, and a trigger, for engaging the line and arm, pivotally connected to the lever, near its free end, said latch means being adapted to be actuated by a pull on the line for releasing the arm.

7. A fishing device comprising a support, an arm pivotally connected at one end thereto and arranged to swing perpendicularly, spring means for urging the arm to a raised position, a gong connected to the support and arranged to be struck by the arm, when it is swung upwardly by the spring means, and latch means for holding the arm in a lowered position, said latch means being adapted to be engaged by a fishing line and actuated by a downward pull thereon, for releasing the arm.

LOUIS ROSEN.